July 10, 1951         A. E. KERWIEN         2,560,353
                      CAVITY RESONATOR
Filed March 16, 1945                     7 Sheets-Sheet 3
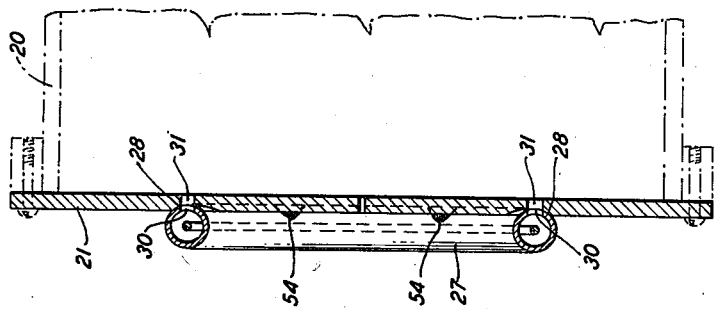
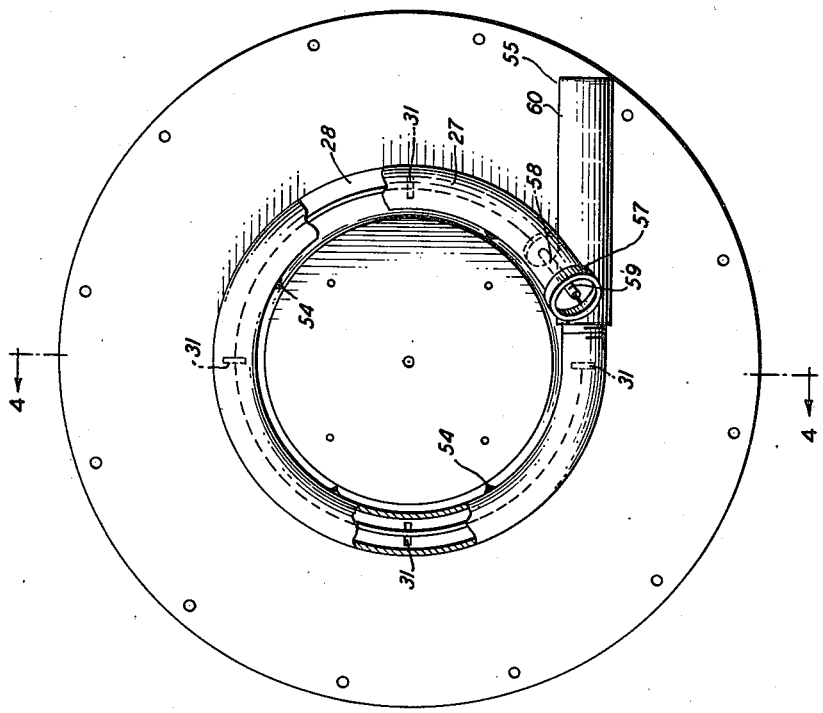
INVENTOR
A. E. KERWIEN
BY
ATTORNEY July 10, 1951 — A. E. KERWIEN — 2,560,353
CAVITY RESONATOR
Filed March 16, 1945 — 7 Sheets-Sheet 4

INVENTOR
A. E. KERWIEN
BY E. V. Griggs
ATTORNEY

July 10, 1951     A. E. KERWIEN     2,560,353
CAVITY RESONATOR

Filed March 16, 1945     7 Sheets-Sheet 5

INVENTOR
A. E. KERWIEN
BY
E. V. Griggs
ATTORNEY

July 10, 1951     A. E. KERWIEN     2,560,353
CAVITY RESONATOR

Filed March 16, 1945     7 Sheets-Sheet 6

INVENTOR
A. E. KERWIEN
BY E. V. Griggs
ATTORNEY

July 10, 1951     A. E. KERWIEN     2,560,353
CAVITY RESONATOR

Filed March 16, 1945     7 Sheets-Sheet 7

INVENTOR
A. E. KERWIEN
BY E. V. Griggs
ATTORNEY

Patented July 10, 1951

2,560,353

UNITED STATES PATENT OFFICE 2,560,353

CAVITY RESONATOR

Arthur E. Kerwien, Ocean Township, Monmouth County, N. J., assignor to Bell Telephone Laboratories, Incorporated, New York, N. Y., a corporation of New York Application March 16, 1945, Serial No. 583,085

8 Claims. (Cl. 178—44)

This invention relates to cavity resonators or electrical resonance chambers as they are sometimes called. More particularly, it relates to effective transmission circuits for transferring oscillation energy to or from such resonance chambers.

An object of the invention is to provide an energy transfer system in which the coupling between the cavity resonator and an external circuit is symmetrical with respect to the internal field of the resonator.

Another object of the invention is to enable the impedance of an energy transfer circuit at its point of coupling with a cavity resonator to be readily varied to effect maximum energy transfer to or from the resonator.

Another object of the invention is to provide a cavity resonator with an energy transfer system which will enhance oscillations of a desired natural resonance mode within the chamber and inhibit oscillations of undesired modes.

Still another object of the invention is to provide a cavity resonator with an energy transfer circuit having such a coupling to the resonator as to favor maintenance therewithin of oscillations of a $TE_{0mn}$ mode while discriminating strongly against concomitant like frequency oscillations of $TE_{1mn}$ mode.

In accordance with an embodiment of this invention a cavity resonator of cylindrical form and with plane circular ends is provided at one end with a reciprocating piston tuner, the position of which is controlled by a differential screw so as to vary the natural resonance oscillation frequencies of the resonator. On the external surface of the opposite end there is provided a coaxial feed line seated in an annular groove. A plurality of apertures extend from the interior of the coaxial feed line through the bottom of the groove into the resonator. The radius of the circle or annulus on which the apertures are located is so designed as to provide effective coupling with the interior electromagnetic field of the resonator and to permit a spacing of an integral number of wavelengths along the coaxial line so that the energy transfer points are in phase with reference to the coaxial line. In one modification, the coaxial line is formed by semicircular grooves in a two-part end plate fitting together to constitute the outer conductor of the coaxial line. Suitable terminating devices enable adjustment to be made in the position along the feed line of the standing wave nodes and loops.

In the drawing

Fig. 3 illustrates the details of the end plate of the cavity resonator of Fig. 1 with portions of the structure broken away;

Fig. 4 is a section in the direction of the arrows along the line 4—4 of Fig. 3;

Figure 1:
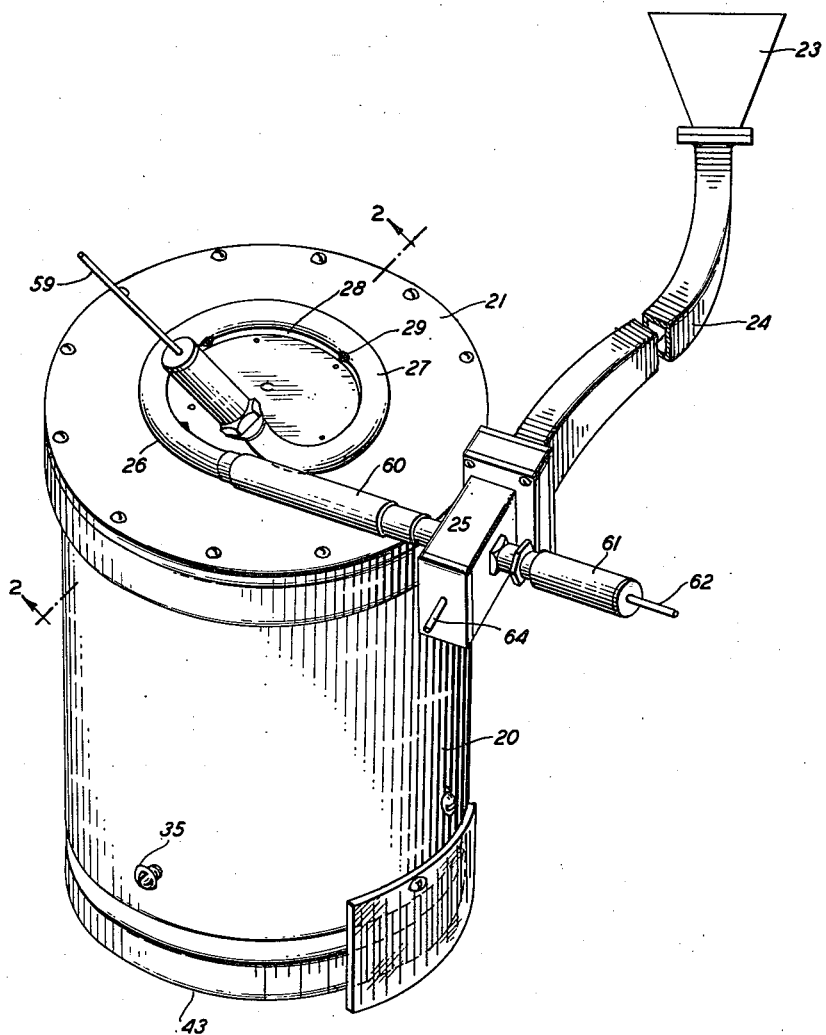
Fig. 1 shows a testing system in accordance with one embodiment of the invention.

Referring to Fig. 1 the cavity resonator 20 comprises a cylindrical chamber of electrically conducting material. One end of the resonator is closed by a removable cover 21. The other end is closed by a piston tuning structure 22. An electromagnetic wave pickup device 23 is connected by a flexible wave guide 24 to the coupling box 25 which serves to connect the wave guide to a curved section 26 of coaxial line which is closely associated with the end plate 21 and which serves from corresponding apertures in the coaxial line 26 and the end plate 21 to feed high frequency energy into the cavity resonator 20 at a plurality of points which are symmetrically positioned with respect to a desired internal electromagnetic field. The transmission structure 23, 24, 25, 26 may also serve to withdraw energy from the internal electromagnetic field of the cavity resonator 20 and to radiate it out from the horn 23. It will be apparent that the central portion of the coaxial conductor 26 is wound in the form of a circular loop 27 and is seated in a circular groove 28 of the top cover plate 21. At a plurality of points 29 the loop is soldered to the end plate 21 to maintain its position fixed with respect thereto.

Figure 2:
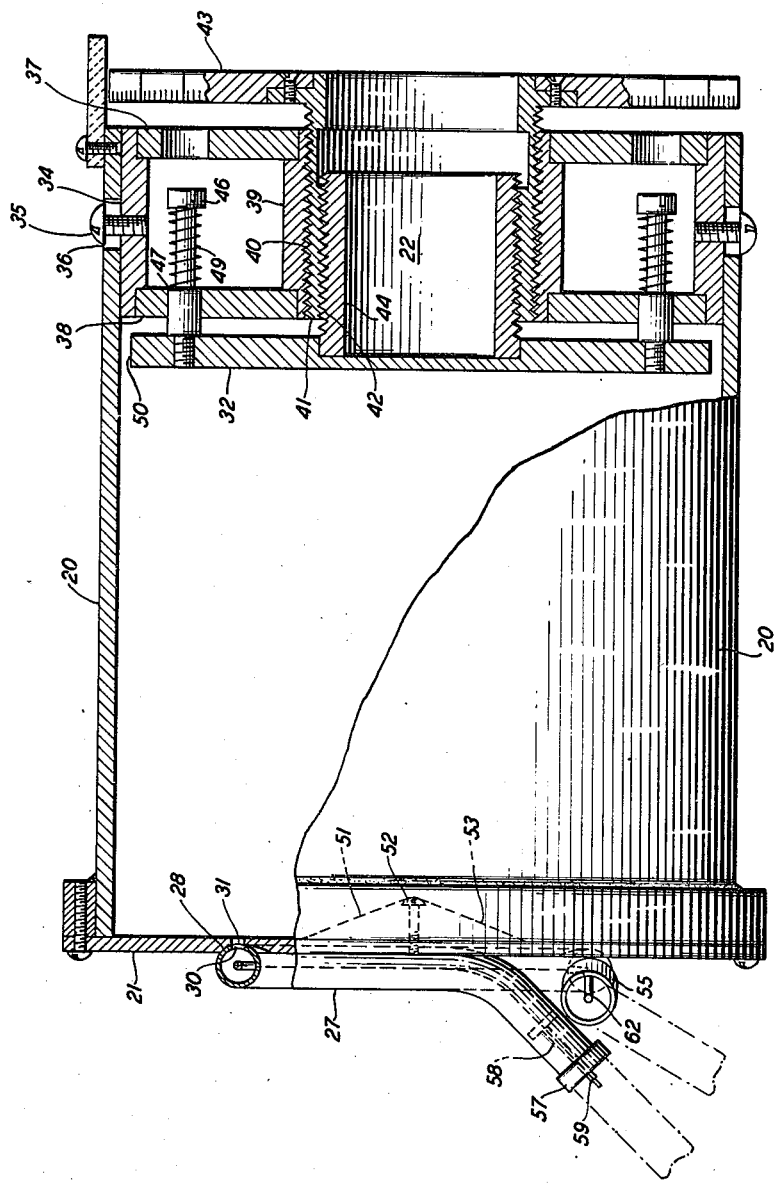
Fig. 2 shows a section of the cavity resonator of Fig. 1 taken along the line 2—2 looking in the direction of the arrows.

Fig. 2 shows a section of the cavity resonator of Fig. 1 along a vertical plane through the line 2—2.

As illustrated in Fig. 2, the circular loop 27 seated in the groove 28 is provided in its face adjacent the groove with a plurality of apertures 30 which are closely aligned with corresponding coupling apertures 31 extending from the bottom of the groove through the end plate 21. In the particular embodiment disclosed in Figs. 1 and 2 there are four symmetrically placed apertures coupling the coaxial section 27 to the interior electromagnetic field of the resonance chamber 20.

The piston tuning mechanism 22 consists of a differential screw apparatus introduced within the end of the resonator 20 and fixedly connected thereto together with a piston tuner plate 32 which is advanced or retracted thereby to increase or decrease the natural resonance frequency of the cavity resonator 20, as desired. A collar or guide member 34 of cylindrical form fitting closely within the cylinder 20 at one end is held in position therein by means of clamping screws 35 extending through slots 36. The collar 34 carries two flat discs 37 and 38 seated against shoulders in the collar 34 and against similar shoulders in a central collar 39. Members 34, 37, 38 and 39, together, form a structural framework which is held stationary after being locked in position by screws 35. The collar 39 is threaded internally as at 40 to receive therewithin the differential screw member 41 which is provided with an exterior thread engaging with the internal threads of the collar 39 and with an internal thread at 42 of slightly different pitch and of opposite character to that at 40 so that as the screw member 41 is rotated by means of its calibrated dial head 43 it will tend to advance along the axis of the cylinder in one direction with reference to the collar 39 at the same time advancing along the axis at a different rate with respect to the central screw-threaded member 44 thus moving the member 44 in an axial direction by an amount dependent upon the difference in pitch of the screw threads at 40 and 42. If these screw threads are given a very slightly different pitch the motion of the piston 32 may be made very gradual so that very fine tuning adjustment is attainable.

The piston 32 and the central member 44 to which it is fixedly attached are both prevented from rotation about the axis of the cylinder by means of the screws 46 which are provided with enlargements 47 fitting closely yet slidably through apertures in the plate 38. Surrounding the screws are springs 49 which serve to retain the piston 32 retracted and thus to take up backlash which may occur in the differential screw. The screws may be adjusted and tightened in position through apertures in the plate 37.

Piston 32 is preferably made sufficiently smaller in diameter than the internal diameter of the resonance chamber 20 so that at its margin 50 there may be a clearance of the order of a sixteenth of an inch. It will be apparent, therefore, that the differential screw mechanism permits adjustment of the position of the piston 32 so as to enable very accurate tuning of the resonant cavity 20.

The mode of oscillation for which a resonant cavity is designed to an extent determines the most desirable location of the coupling to its external circuit. In the case of cylindrical cavity resonators provided at one end with a reciprocating piston tuner, it is, of course, desirable for both mechanical and electrical reasons, to place the coupler at a position somewhat remote from the tuner. The oscillations of $TE_{01n}$ mode the electric field is of maximum intensity in a cylindrical zone at about .54 of the radius of the cylinder from its center. If, however, a single coupling be effected at a point, for example, .54 of a radius from the center of the cylinder, the reaction of the coupled circuit upon the field tends the cavity resonator is non-symmetrical and tends to distort the internal electromagnetic field. Moreover, such a single point coupling may stimulate oscillations of a plurality of modes and particularly of the oscillations of the $TM_{11n}$ mode. This $TM_{11n}$ mode of oscillation is particularly undesirable as a concomitant of $TE_{01n}$ mode oscillations for the reason that it behaves as if coupled to the $TE_{01n}$ mode and it absorbs energy from the $TE_{01n}$ mode and dissipates it thus reducing the ringing time or time of resonance response of the cavity resonator. One expedient which, per se, antedates the present invention is that of a suppression web which consists of conductors arranged in a radial network so as to be perpendicular to the electric field of $TE_{01n}$ mode oscillations and therefore not to absorb energy of that mode. The conductors of the web are, however, generally parallel to radial electric vectors thus serving to absorb their energy and damp oscillations which involve radial electric vectors. A suppression web of this type may be introduced into the apparatus of Fig. 2 as a plurality of conductors 51 which may be of No. 42 B & S gauge "advance" wire alloy extending from the head of a screw 52 to points 53 on the inner surface of the end plate 21. This suppression web feature will be considered in more detail in connection with the discussion of a subsequent figure.

The energy transmission circuit for exciting the cavity resonator or for withdrawing energy from the resonator is shown in Figs. 1, 2 and 3, in which the coaxial loop 27 serves as a coupling path for the resonant cavity 20. This loop may be bent at one end 55 for connection to the principal transmission circuit as, for example, to the wave guide 25 shown in Fig. 1. The other terminal 57 is provided with a short-circuiting tuning piston 58 which provides a suitable termination for the coaxial ring 27. The ring 27 is given such a diameter as to enable it to be placed contiguous to the end of the zone of maximum field intensity for $TE_{01}$ mode oscillations.

The coaxial loop 27, as has previously been explained, is seated in the circular groove 28 in the outer surface of the end plate 21 and is so positioned that its coupling orifices 30 are aligned with orifices 31 extending through the end plate. As indicated in Figs. 3 and 4, the outer conductor of the coaxial loop 27 is held fixed with respect to the plate 21 by means of soldered connections at the points 54. A variable position short-circuiting termination is provided at one end of the ring 27 by the piston 58 which fits closely between the central and outer conductors of the coaxial loop and the position of which is manually adjustable in well-known manner by means of a projecting tubular element 59 which fits closely about the central conductor. The other terminal of the loop 27 is connected to a straight section 60 of coaxial conductor which leads to the rectangular wave guide coupling section 61. Section 25 constitutes the termination of the wave guide 24. The outer conductor of the coaxial element 60 is screw-threaded into the wall of the section 25. The inner coaxial conductor passes through the coupling section 25 and on through a coaxial terminal section 61 connected at the opposite side of coupling section 25. A short-circuiting plunger device 62 similar to the device 58, 59 enables the section 61 to be so adjusted as to effectively couple the coaxial system to the electromagnetic field within the wave guide. In order to improve the coupling the wave guide section 25 is provided with a plunger tuner 63, a manipulating handle 64 of which enables the adjustment of the plunger with reference to the transverse coaxial system.

It will be apparent that energy of electromagnetic waves received at the pickup horn 23 will be guided by the wave guide 24 to the terminal section 25 at which it is transferred to the coaxial conductor system 61, 60, 27, the field between the conductors of the coaxial loop 27 being coupled at the orifices 30, 31 to the field within the resonator 20. The incoming energy will tend to excite the resonator 20. In order to insure a symmetrical excitation of the field within the resonator 20, the coupling apertures 30, 31 should be uniformly spaced along the loop 27 and for $TE_0$ mode oscillations should be separated by an integral multiple of a wavelength in order to bring excitations at these orifices into phase agreement. In apparatus constructed in accordance with Figs. 3 and 4 for 3.2 centimeter waves it was found possible to separate the apertures by two wavelengths and to make the radius of loop 27 such that the apertures are at substantially correct position for most effective excitation. In this device the apertures are arranged in series with respect to the transmission line. Since the adjusting terminating device 58, 59 will tend to cause standing waves to be set up within the loop 27 the field between the coaxial conductors in the loop 27 will vary from a minimum at a nodal point to a maximum at points half way between those. It is, therefore, important that the positions of the orifices be such as to experience a strong field in order to set up an effective excitation. For this purpose the terminating device 58, 59 is very useful since it enables the terminal nodal point at piston 58 to be effectively moved along the coaxial loop 27 to secure substantially any relationship of nodes with respect to the coupling apertures that may be desired thus varying the coupling. In practice this device is found to be very effective especially where the position and size of the coupling apertures are invariable.

Figure 6:
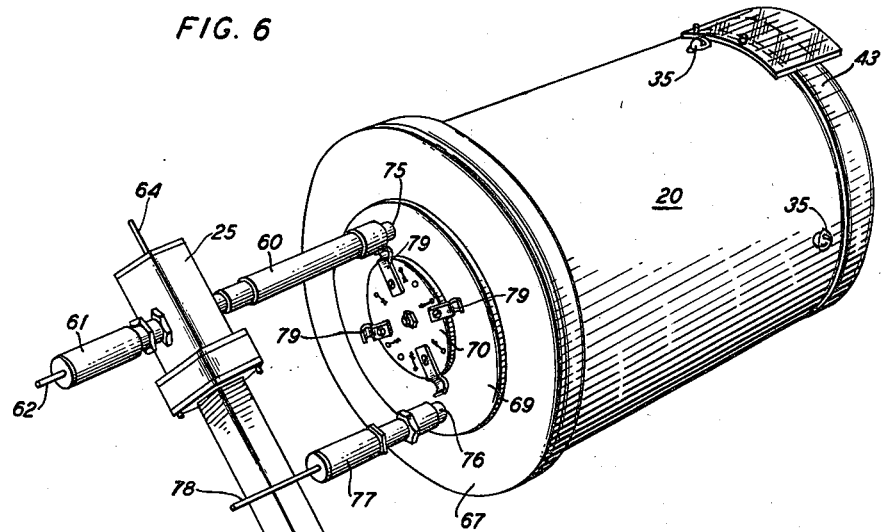
Fig. 6 illustrates an alternative form of the testing system shown in Fig. 1.
Figure 5:
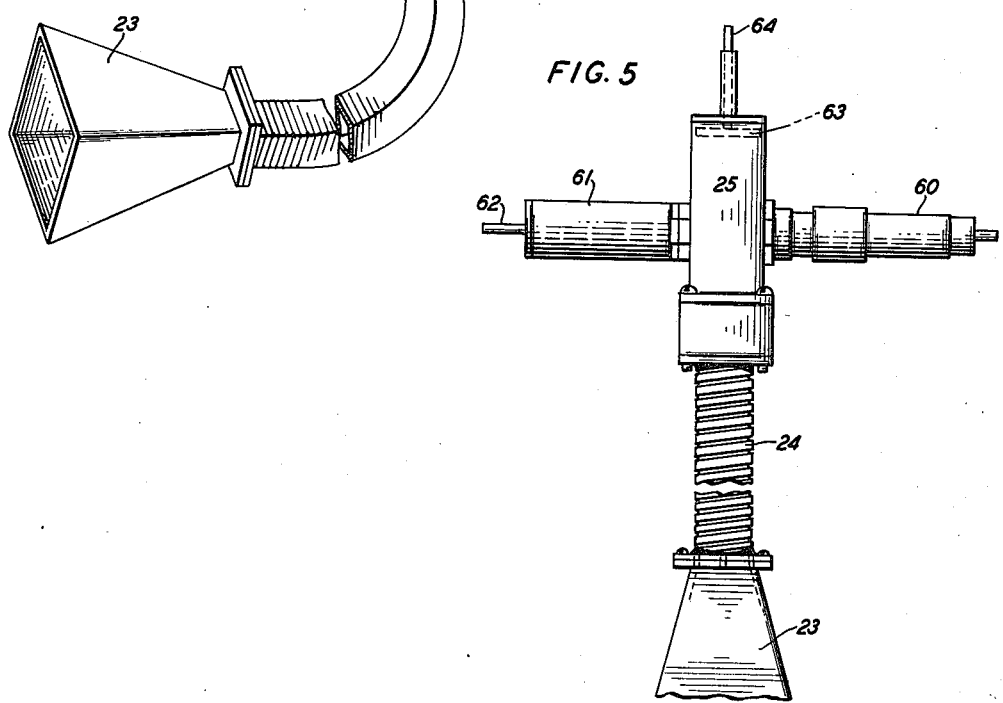
Fig. 5 is a plan view of the coupling of the box structure of Fig. 1.
Figure 8:
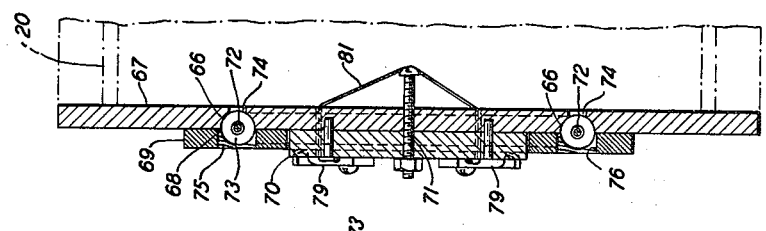
Fig. 8 is a section of Fig. 7 along the line 8—8.
Figure 7:
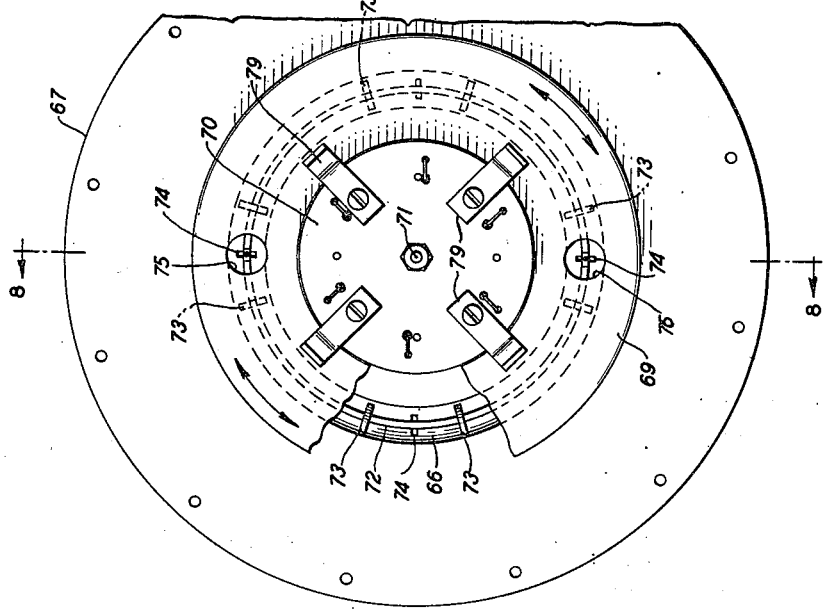
Fig. 7 is a plan view of the removable end plate of the cavity resonator of Fig. 6.

Fig. 6 illustrates a modification of the coupling circuit of Fig. 1 in which in lieu of the coaxial loop 27 a closed circular coaxial loop is formed by a circular groove 66 of semicircular section as indicated in Fig. 8 in removable end plate 67 and a complementary circular groove 68 in an annular plate 69 which fits closely about a central circular hub plate 70 attached to the outer surface of the end plate 67 by the central screw bolt 71. Accordingly, the surface of the grooves 66 and 68 together constitute the outer conductor of the closed coaxial ring. Centrally positioned within this outer conductor is a closed ring inner coaxial conductor 72 spaced from the outer conductor by a series of insulating washers 73 of polystyrene or other suitable dielectric material. As in the case of the structure of Fig. 1 the end plate is provided with four radially coupling orifices 74 in the form of small slots of the order of $\frac{3}{32}$ of an inch in a circumferential direction and of $\frac{1}{8}$ of an inch in a radial direction. Connection to the wave guide coupling section 25 is made by a transverse coaxial conductor system 60, 61 similar to that of Fig. 1. The coaxial section 60 leads through an opening 75 in the annular plate 69. The central coaxial conductor passes through the opening and is soldered or otherwise conductively connected to the central ring conductor. At a point diametrically opposite the opening 75 a second opening 76 is provided. As in the case of the section 60 the outer conductor of the section 77 is electrically connected to the ring 69 and the inner conductor extends through the opening 76 and is soldered or otherwise electrically connected to the central conductor 72 of the closed ring. A terminating section 77 having a plunger device 78 similar in every respect to the terminal device 58, 59 of the apparatus of Fig. 1 enables the nodal point of the section 77 to be varied in order to effectively tune and terminate the coaxial ring conductor.

Since the coupling circuit is connected to the closed ring at point 75 and the terminating device is connected at the diametrically opposite point 76 the closed ring actually constitutes two parallel semicircular feed paths between which the energy transmitted to the cavity resonator divides. It will of course be understood that the discriminating effect obtained by the use of a plurality of cophasal couplings may be had by either series or parallel feed circuits but that it is dependent upon proper phase relations between the various coupling points for oscillations of the desired mode and opposing phase relations between these points for oscillations of a mode which is to be suppressed.

The annular plate 69 is held tightly against the outer surface of end plate 67 by means of spring clips 79, a plurality of which extend laterally from the hub member 70 and bear against plate 69. It is, therefore, possible to physically rotate the plate 69 with reference to the central axis through the screw 71 thus carrying the connecting section 60 and the terminating section 77 in a circumferential direction with reference to the orifices 74. This facilitates securing an optimum relation between the feed point at which energy is introduced into the coaxial ring and the coupling points at the orifices 74.

Figure 9:
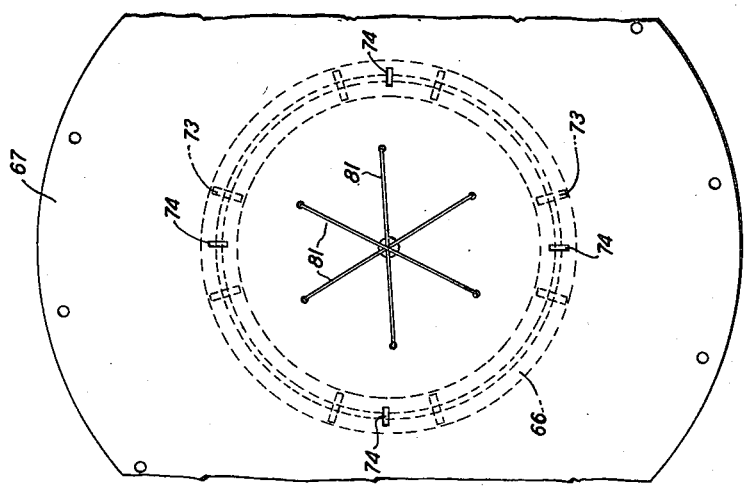
Fig. 9 shows a plan view of the removable end plate of the cavity resonator of Fig. 6 looking at the structure from the side opposite that of Fig. 7 or, in other words, from within the cavity resonator.

As illustrated in Figs. 8 and 9 a suppression web similar to the web 51, 52, 53 to which reference was made in connection with Fig. 2 may be employed to assist in suppression of oscillations of undesired modes. As illustrated, this may comprise six fine wires 81 extending generally in a radial direction from the head of the screw to points at a distance of the order of a third of the radius of the resonator. Oscillations of modes having radially directed electric vectors will tend to induce currents in the wires 81 thus dissipating the energy of such oscillations. It has been found that expedients which tend to reduce oscillations of an equal frequency undesired mode cause the Q or resonance persistence for the equal frequency oscillations of a desired mode to be enhanced.

The outstanding advantage of the symmetrical arrangement of feed orifices of the present invention is occasioned by the fact that these couplings enable a symmetrical energization of the resonator. This in itself tends to reduce the coupling to undesired modes of oscillation which may otherwise tend to occur. For example, with a single orifice 74 such as disclosed, it is possible to excite oscillations of $TE_{01}$ mode. The single orifice coupling is also suitable for excitation of oscillations of $TE_{02}$, $TE_{03}$ and $TE_{04}$ modes. However, with the symmetrical arrangement of multiple orifices disclosed and with provisions to cause excitation at the various orifices to be in phase agreement it is not possible to excite oscillations of $TE_{02}$ or $TE_{03}$ modes since the excitations of the various apertures do not bear the essential phase relations for these undesired modes. Moreover, the use of the narrow radial slots and of the suppression web in conjunction with the symmetrical feed system tends to discriminate and to suppress oscillations of TM modes for which the coupling apertures are relatively ineffective and for which the web conductors 81 serve as effective energy absorbers.

Figure 10:
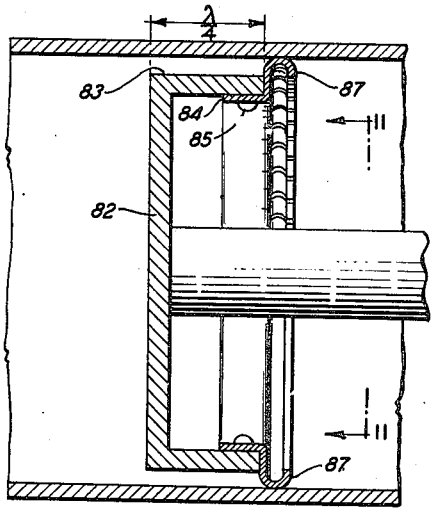
Fig. 10 is a partial section of an alternative form of the movable tuner piston of Fig. 2.
Figure 11:
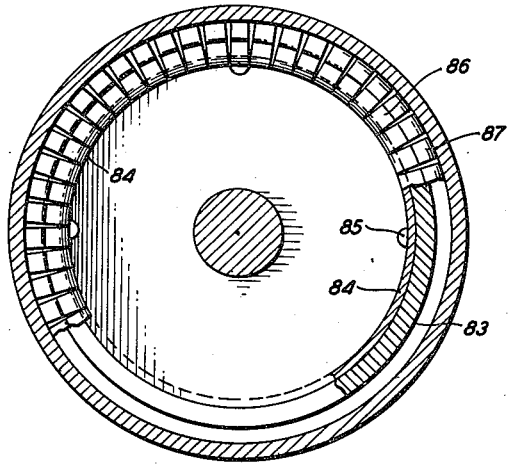
Fig. 11 is a plan view of the structure of Fig. 10, looking in the direction of the arrows.
Figure 12:
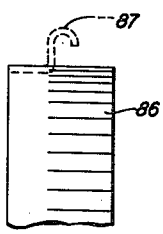
Fig. 12 is a detail showing the manner of forming the structure of Fig. 11.

Fig. 10 discloses a modification of the tuning piston 32 in which the piston 82 is formed with an outwardly turned flange 83 having a clearance between the flange and the side wall of the resonator 20 of the order of ⅛ of an inch for centimeter waves. Within the flange is a cylindrical closure member 84 attached at one edge by screws 85 to the flange 83 and having its outer edge split, as shown in Fig. 12, to form a toothed comb 86. The teeth of this comb which consist of resilient or springy material of relatively high conductivity are bent into circular contact fingers 87 as indicated in dotted lines in Fig. 12. These contact fingers glide along the inner surface of the resonator 20 to form an effective seal for electromagnetic wave energy. From the face of the piston 82 to the termination formed by the fingers 87 the peripheral slot extends for a depth of a quarter wavelength as indicated in Fig. 10. This expedient prevents loss of energy of oscillations of the desired wavelength while at the same time permitting substantial dissipation of undesired oscillations of other frequencies.

Figure 13:
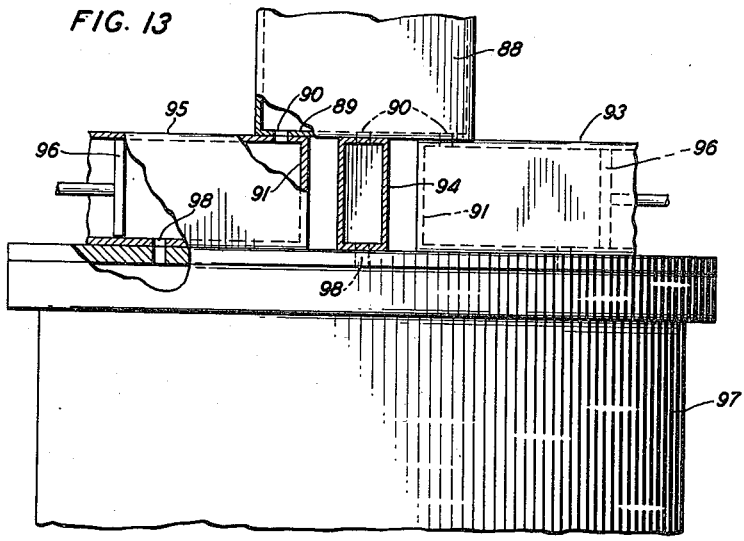
Fig. 13 is an elevation of a wave guide multiple coupling to a cavity resonator.
Figure 14:
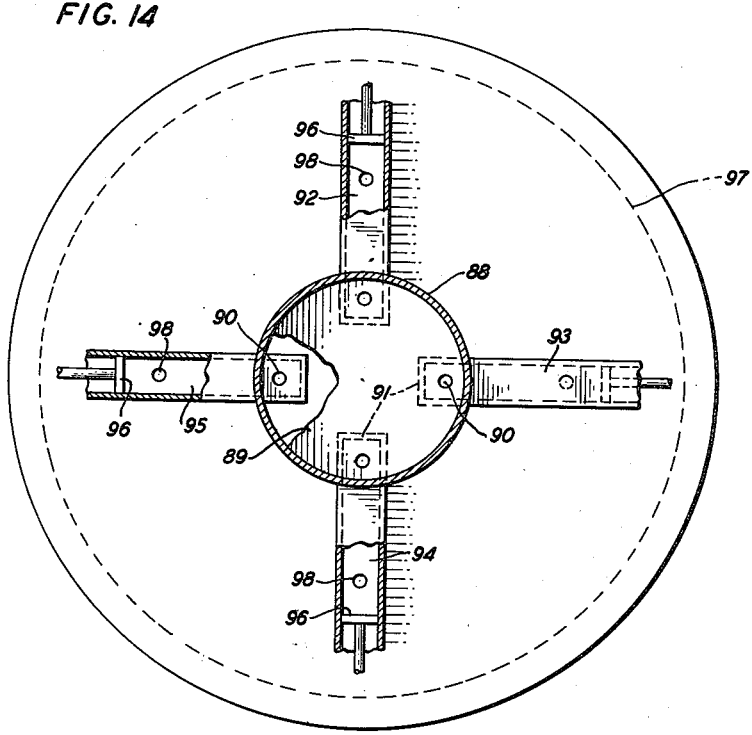
Fig. 14 is a plan view of the structure of Fig. 13.

Fig. 13 illustrates a multiple coupling device for a cavity resonator employing a wave guide coupling device. The external energy transmission path or "feed line" in this instance is the cylindrical wave guide 88, the terminating end wall 89 of which is provided with four coupling apertures 90 which register with corresponding apertures in the upper walls of separate short wave guides 92, 93, 94, 95. The branches 92 to 95, inclusive, are rectangular in form with their longer sides extending vertically to assist in discrimination against oscillations the electrical polarization of which does not agree with that of oscillations in the resonator of the desired mode, in this case, the $TE_{01n}$ mode. The four branches are separated at their inner ends and extend outwardly radially at 90 degrees angular separations. Each branch is provided at its outer end with a tuning-plunger and piston 96. The four branched coupling device 91 accordingly is excited by the wave guide 88 and serves to an extent to suppress oscillations of other modes for which the four coupling apertures 90 are not in like phase position. The apertures 90 should each be at a distance from the closed end of its respective branch guide that energy reflected from the closed end will be in phase with incoming energy at the aperture. In general this will occur at a spacing of the order of a quarter wavelength. Optimum coupling may be had by suitable choice of the size of the coupling iris. The apertures 90 should be placed at that distance from the center of the wave guide 88 which will insure most efficient transfer of energy from the guide 88 to the branch guides, taking into account the distribution of the field in the circular wave guide 88. The four branches of the coupling device 91 are in turn coupled to the cavity resonator 97 by four apertures 98, each extending through the lower wall of a respective branch of the coupling device and through the upper wall of the cavity resonator at a point which is effective for excitation in the cavity resonator of oscillations of the desired mode. This four aperture coupling tends additionally to suppress transmission of oscillations for which the apertures are not in like phase position. It enables the cylindrical wave guide 88 which is excited in $TE_{01}$ mode to, in turn excite the cavity resonator 97 in $TE_{01n}$ mode. It will be understood that a mode suppression web such as that disclosed in Fig. 9 may also be incorporated in this structure. In other respects the elements of a testing system such as those of Figs. 13 and 14 may be identical with those of Figs. 1 and 2 and for that reason are not illustrated.

What is claimed is:

1. An electrical resonator of high Q comprising a hollow cylindrical conductive-walled chamber dimensioned to support electromagnetic waves of predetermined frequency and $TE_0$ mode therein, said chamber having a circular end wall provided with slit-like, radially-directed apertures disposed symmetrically about the center of said end wall substantially in registry with a cylindrical zone of maximum field intensity of said $TE_0$ mode, and a coaxial conductor line extending across the exterior face of said end wall in lateral contact therewith and coupled to the electromagnetic field within said chamber at and through each of said apertures, the electrical length of said coaxial line between successive apertures being an integral multiple of a wavelength at said predetermined frequency, whereby said line is coupled in mode-selective energy transfer relation with the interior of said chamber.

2. An electrical resonator in accordance with claim 1 in which there are a plurality of diametrically-opposite pairs of said apertures.

3. An electrical resonator in accordance with claim 1 including tuning means connected to said coaxial line for adjusting the position of nodes of standing waves in said line with respect to said apertures.

4. In a high frequency system, a conductive walled tubular structure of circular cross section adapted to sustain within its interior electromagnetic oscillations of $TE_0$ mode and predetermined frequency and having in a wall thereof a plurality of coupling apertures disposed symmetrically about the longitudinal axis of said tubular structure and at substantially the same radial distance therefrom, and a coupling circuit therefor comprising a shielded transmission line that extends along said last-mentioned wall to said apertures in succession, the interior of said line communicating at and through the several said apertures with the interior of said tubular structure, and the electrical length of said line between successive apertures being an integral multiple of a wavelength at said predetermined frequency, whereby said line is coupled to said structure selectively with respect to waves of said $TE_0$ mode in said structure.

5. In a high frequency system, a conductive walled tubular structure of circular cross section adapted to sustain within its interior electromagnetic oscillations of $TE_0$ mode and predetermined frequency and having in a wall thereof a plurality of coupling apertures disposed symmetrically about the longitudinal axis of said tubular structure and at substantially the same radial distance therefrom, and a coupling circuit therefor comprising a shielded transmission line that extends along said last-mentioned wall to said apertures in succession, the interior of said line communicating at and through the several said apertures with the interior of said tubular structure, and the electrical length of said line between successive apertures being an integral multiple of a wavelength at said predetermined frequency, whereby said line is coupled to said structure selectively with respect to waves of $TE_0$ mode in said structure, said apertures being of an even number and in the form of slots disposed with their width dimensions in a circumferential direction about said axis.

6. A combination in accordance with claim 5 in which said slots are substantially in registry with a cylindrical zone of maximum field intensity of said $TE_0$ mode.

7. A tunable microwave resonator comprising a hollow, substantially closed, cylindrical chamber of high Q having a conductive side wall and parallel circular end walls for sustaining within its interior space electromagnetic oscillations of a $TE_{01n}$ mode and predetermined frequency, one of said circular end walls having a concentric circular groove provided with a plurality of coupling apertures spaced along its length and communicating with said chamber, a rotatable plate having a complementary circular groove forming with said first groove the outer conductor of a coaxial conductor loop, an inner conductor for said coaxial conductor loop, and means attached to said plate for exciting said loop with wave energy of said frequency, said apertures being spaced apart by an integral multiple of a wavelength as measured along said loop.

8. The structure of claim 7, wherein said apertures are radial slots and said loop lies in registry with the cylindrical zone of maximum field intensity of said $TE_{01n}$ mode, and tuning means for said coaxial line adapted to vary the position of standing wave modes with respect to said apertures.

ARTHUR E. KERWIEN.

REFERENCES CITED

The following references are of record in the file of this patent:

UNITED STATES PATENTS

| Number | Name | Date |
|---|---|---|
| 2,102,805 | O'Donovan | Dec. 21, 1937 |
| 2,129,714 | Southworth | Sept. 13, 1938 |
| 2,147,717 | Schelkunoff | Feb. 21, 1939 |
| 2,206,923 | Southworth | July 9, 1940 |
| 2,226,479 | Pupp | Dec. 24, 1940 |
| 2,241,119 | Dallenbach | May 6, 1941 |
| 2,297,202 | Dallenbach | Sept. 29, 1942 |
| 2,337,184 | Carter | Dec. 21, 1943 |
| 2,349,942 | Dallenbach | May 30, 1944 |
| 2,406,372 | Hansen | Apr. 27, 1946 |
| 2,418,472 | Kline | Apr. 8, 1947 |
| 2,434,508 | Okress | Jan. 13, 1948 |
| 2,439,388 | Hansen | Apr. 13, 1948 |
| 2,443,612 | Fox | June 22, 1948 |
| 2,453,760 | Schelleng | Nov. 16, 1948 |
| 2,455,158 | Bradley | Nov. 30, 1948 |
| 2,471,021 | Bradley | May 24, 1949 |
| 2,471,419 | Edson | May 31, 1949 |